United States Patent
Lewicki et al.

(10) Patent No.: US 7,571,360 B1
(45) Date of Patent: Aug. 4, 2009

(54) SYSTEM AND METHOD FOR PROVIDING A CLOCK AND DATA RECOVERY CIRCUIT WITH A FAST BIT ERROR RATE SELF TEST CAPABILITY

(75) Inventors: Laurence D. Lewicki, Sunnyvale, CA (US); Amjad T. Obeidat, Santa Clara, CA (US); Nicolas Nodenot, Mountain View, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 488 days.

(21) Appl. No.: 10/973,843

(22) Filed: Oct. 26, 2004

(51) Int. Cl.
*G06F 11/00* (2006.01)

(52) U.S. Cl. ...................................... 714/704
(58) Field of Classification Search ................. 714/704
See application file for complete search history.

(56) References Cited

U.S. PATENT DOCUMENTS

| | | | | |
|---|---|---|---|---|
| 5,835,501 A * | 11/1998 | Dalmia et al. | ............... | 714/704 |
| 6,122,336 A * | 9/2000 | Anderson | ................... | 375/371 |
| 6,625,560 B1 * | 9/2003 | Molla et al. | ................ | 702/120 |
| 6,988,227 B1 * | 1/2006 | Perrott | ........................ | 714/704 |
| 7,069,488 B2 * | 6/2006 | Moll et al. | .................. | 714/736 |
| 7,127,017 B1 * | 10/2006 | Evans et al. | .................. | 375/355 |
| 7,162,002 B2 * | 1/2007 | Chen et al. | .................. | 375/376 |
| 7,171,601 B2 * | 1/2007 | Frisch | ........................ | 714/738 |
| 7,180,352 B2 * | 2/2007 | Mooney et al. | ............. | 327/237 |
| 7,231,558 B2 * | 6/2007 | Gentieu et al. | ............... | 714/704 |
| 7,363,562 B2 * | 4/2008 | Waschura et al. | ........... | 714/731 |
| 2001/0016929 A1 * | 8/2001 | Bonneau et al. | ............. | 714/735 |
| 2002/0039394 A1 * | 4/2002 | Buchwald et al. | ........... | 375/355 |
| 2003/0041294 A1 * | 2/2003 | Moll et al. | .................. | 714/709 |
| 2003/0198105 A1 * | 10/2003 | Yamaguchi et al. | ......... | 365/200 |
| 2004/0022337 A1 * | 2/2004 | Moll | .......................... | 375/355 |
| 2005/0031029 A1 * | 2/2005 | Yamaguchi et al. | ......... | 375/226 |
| 2005/0169168 A1 * | 8/2005 | Aronson et al. | ............. | 370/222 |
| 2005/0180536 A1 * | 8/2005 | Payne et al. | ................. | 375/354 |
| 2005/0201500 A1 * | 9/2005 | Shizuki | ...................... | 375/350 |
| 2005/0267696 A1 * | 12/2005 | Yamaguchi et al. | ........... | 702/57 |

OTHER PUBLICATIONS

Kun-Yung Ken Chang et al., "A 0.4-4-Gb/s CMOS Quad Transceiver Cell Using On-Chip Regulated Dual-Loop PLLs", IEEE Journal of Solid-State Circuits, vol. 38, No. 5, May 2003, pp. 747-754.

* cited by examiner

*Primary Examiner*—Guy J Lamarre
*Assistant Examiner*—Sam Rizk (57) ABSTRACT

A system and method is disclosed for providing a clock and data recovery circuit with a fast bit error rate self test capability. A bit error rate test control unit is provided that causes the clock and data recovery circuit to sample data adjacent to an edge of a bit period to create errors at a relatively high bit error rate. This is accomplished by intentionally introducing an interpolator offset in a phase position of a data clock signal. The test control unit generates a first bit error rate and then subsequently generates a second bit error rate. The test control unit then uses the values of the first and second bit error rates to extrapolate a value of bit error rate for the clock and data recovery circuit that corresponds to a zero value of interpolator offset.

20 Claims, 6 Drawing Sheets

SYSTEM AND METHOD FOR PROVIDING A CLOCK AND DATA RECOVERY CIRCUIT WITH A FAST BIT ERROR RATE SELF TEST CAPABILITY

TECHNICAL FIELD OF THE INVENTION

The present invention is generally directed to the manufacture of clock and data recovery circuits for semiconductor devices and, in particular, to a system and method for providing a clock and data recovery circuit having a fast bit error rate self test capability.

BACKGROUND OF THE INVENTION

A clock and data recovery (CDR) circuit is an integral part of a modern data communication system. A CDR circuit is connected to and interfaces with a data signal line that carries incoming data. The CDR circuit performs the function of extracting the incoming data and clock information from the incoming data stream. This function is typically performed with an electronic control loop that detects the incoming data. Based on the data edge locations in time, the electronic control loop makes a determination of the instantaneous phase of the data.

The electronic control loop subsequently aligns the electronic control loop's own internal clock with the phase of the incoming data. This alignment allows the CDR circuit to sample the data in the middle of the bit period to ensure that a maximum signal-to-noise ratio is achieved. The aligned clock signal is also referred to as the recovered clock signal because it represents a clock signal that is synchronous with the recovered data.

There are two main architectures in the prior art that are used to construct a clock and data recovery (CDR) circuit. The primary difference between the two systems is the way the recovered clock signal is generated. A first CDR type system generates the recovered clock signal with a voltage controlled oscillator (VCO). The VCO based system is capable of generating the recovered clock signal at the same frequency as the data. In addition, the VCO based system can vary the recovered clock phase to match the phase of the data.

A second CDR type system uses a phase interpolator to vary the phase of a reference clock signal that is supplied to it from another on-chip block (typically, a phase-lock loop (PLL)) that produces a nominal clock frequency that matches the nominal frequency of the incoming data. The interpolator produces a new clock signal with an interpolated phase that is varied to match the phase of the incoming data. This clock signal is then used to sample the data in the middle of the bit period. The interpolated clock signal, in this case, is also referred to as a recovered clock signal. Even though this system (i.e., the interpolated phase system) uses a reference clock signal with a fixed frequency, it can still adjust the interpolated clock frequency to match the variation in frequency of the incoming data. The frequency shift is accomplished by continuously varying the phase of the interpolated clock signal to translate it into a frequency shift.

The electronic control loop uses a phase detector at its input to compare the phase of the incoming data to the phase of the internal clock signal. The phase detector determines whether the clock phase is early or late relative to the incoming data signal. The electronic control loop subsequently makes a decision to vary the phase of the internal clock signal in such a way as to eliminate the phase difference between the clock signal and the incoming data signal.

The data sampling is accomplished through the use of input comparators that are driven from one or more phases of the internal (i.e., recovered) clock signal. Under ideal conditions, these comparators sample each data bit in the middle of the bit period and make a determination whether the bit is zero or the bit is one and pass on the decision as the recovered data.

A clock and data recovery (CDR) circuit of the phase interpolation variety tracks an incoming data stream by continuously varying the phase of the internal (i.e., recovered) clock signal through phase interpolation. A system that uses a phase interpolator CDR circuit can be used to recover data with a bandwidth that is higher than the native capability of the process technology. For example, it is possible to use a phase interpolator CDR system to recover a data stream running at four Gigabits per second (4 Gb/s) while using a process technology that can not operate at frequencies higher than one Gigahertz per second (1 GHz/s).

In such a case, the data stream is broken down into several parts and each part is processed in parallel at a lower speed. More specifically, the number of input comparators can be increased and these comparators no longer need to sample every consecutive bit. In the example mentioned above, this means that the number of comparators must be increased from one comparator to four comparators. Each of the four comparators would sample the data at a rate of one Giga sample per second (1 Gsample/s). Therefore, each of the four comparators samples every fourth bit from the data stream. The output of the four comparators is subsequently combined in the correct order to reconstruct the data stream.

Figure 1:
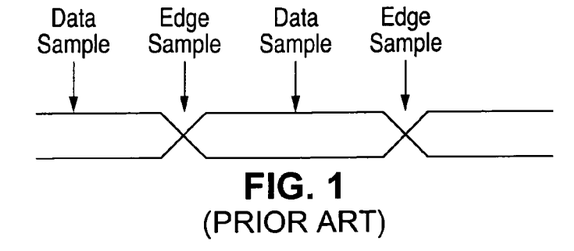
FIG. 1 illustrates a prior art input data signal with arrows that show locations where a data sample may be taken in the middle of a bit period and where an edge sample may be taken near the edge of a bit period.

In practice a system that uses a phase interpolator CDR circuit acquires more than one sample per bit in order to determine the phase of a given bit. In fact, two samples per bit are required in order for the phase detector to make an early-or-late determination for each bit. Therefore, for a CDR circuit with an internal clock running at the same frequency as that of the data stream, two comparators are used to sample the data stream. The two comparators, in this case, are driven by two clock phases that are separated by one hundred eighty degrees (180°). This results in a sample taken in the middle of the bit period (the data sample) and a sample taken near the edge of the bit period (the edge sample) as shown in FIG. 1.

A CDR circuit that operates at the same rate as the data rate of the incoming data stream would need two input comparators, a first input comparator for sampling the data in the middle of the bit period, and a second input comparator for sampling the edge of the bit period. This type of sampling is called "full rate, double sampling." A CDR circuit that operates at one half of the data rate of the incoming data stream would need four input comparators. This type of sampling trades off more circuitry (and corresponding area) for a relaxation in the speed requirement. This type of sampling is called "half rate, double sampling."

Figure 2:
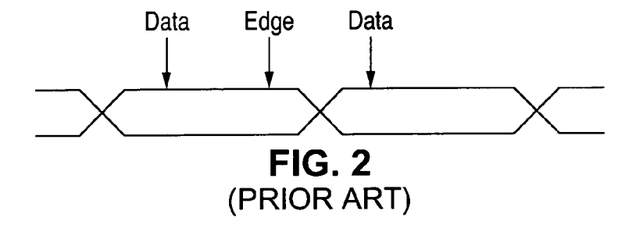
FIG. 2 illustrates a prior art input data signal in which three consecutive data-edge-data samples have been taken and in which the edge sample is the same as the first data sample indicating that the sampling clock is early.
Figure 3:
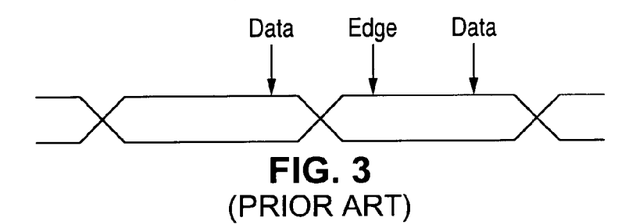
FIG. 3 illustrates a prior art input data signal in which three consecutive data-edge-data samples have been taken and in which the edge sample is the same as the second data sample indicating that the sampling clock is late.

Finally, as the incoming data bits are sampled, they are processed by digital control circuitry that looks for bit transitions and determines whether the clock is sampling too early or too late. This is accomplished by comparing three consecutive data-edge-data samples and looking for a data transition. If there is no data transition in the data bit, then the sample set does not produce phase information. Otherwise, the three samples are compared. If the edge sample is the same as the first data sample, then the sampling clock is early. This situation is illustrated in FIG. 2. On the other hand, if the edge sample is the same as the second data sample, then the clock is late. This situation is illustrated in FIG. 3.

These early and late decisions are accumulated and used to advance or retard the phase of the interpolated clock signal.

This is accomplished by a Finite State Machine (FSM) block that controls the phase interpolator and sets the phase position of the recovered clock signal.

Various types of prior art systems exist that use the double sampling technique for each bit in order to recover the clock and data information. The data and edge samples are produced by a digital filter and are used to make phase advancement or retardation decisions. U.S. Pat. No. 6,002,279 issued on Dec. 14, 1999 to W. P. Evans et al. entitled "Clock Recovery Circuit" discloses a CDR architecture in which a digital filter is implemented as a divide-by-sixteen (16) block and a phase interpolator is driven by a bank of nonlinear digital-to-analog converters (DACs). The nonlinear DACs are needed to maintain an appropriate bias condition for the bipolar phase interpolator circuit.

U.S. Pat. No. 6,122,336 issued on Sep. 19, 2000 to M. B. Anderson entitled "Digital Clock Recovery Circuit With Phase Interpolation" discloses a CDR architecture that uses an all-CMOS implementation which does not require the use of nonlinear digital-to-analog converters (DACs). This design uses phase interpolators to generate a large number of fine increments in the recovered clock phase. This design then uses a phase selection unit to pick an appropriate phase used in sampling the data. This implementation requires the generation of a large number of phases for the phase selection unit to choose from.

This added complexity is addressed in United States Patent Application No. 2003/0002607 A1 published on Jan. 2, 2003 by S. R. Mooney et al. entitled "Clock Recovery Using Clock Phase Interpolator." This system eliminates the phase selection unit with a fast phase interpolator with fine increment resolution. The system starts with a delay-lock loop (DLL) that generates four clock phases. These phases are then fed to a phase interpolator that generates the final, desired clock phase. The phase interpolator is driven by a control circuit that takes the output of the phase detector and converts it to a digital signal using an analog-to-digital converter (ADC). The need for an ADC adds to the complexity of the implementation.

This added complexity is addressed in a paper entitled "A 0.4-4 Gb/s CMOS Quad Transceiver Cell Using On-Chip Regulated Dual Loop PLLs" by K.-Y. K. Chang et al. published in the IEEE Journal of Solid-State Circuits, Volume 38, No. 5, pp. 747-754, May 2003. This system uses binary phase detectors that determine whether the sampling clock is early or late. These binary signals can be fed directly into the control logic circuitry to make the determination whether the phase interpolator should advance or retard the phase of the sampling (i.e., recovered) clock signal.

From the discussion and the references cited above it is clear that a canonical form exists for phase interpolator-based clock and recovery circuits. In general the prior art circuits contain a phase locked loop (PLL) or a delay lock loop (DLL) to generate the initial clock phases, one or more phase interpolators that generate the recovered clock signal, two or more phase detectors that determine the relationship of the clock signal relative to the data signal, and mixed-signal or digital control circuitry that determines the appropriate clock phase and controls the phase interpolators.

A communication system typically has to meet a minimum bit error rate (BER) in order to be useful. This means that the measurement of the bit error rate is one of the most fundamental measurements to be performed on a communication system. One of the most influential factors on the measurement of a bit error rate is the selection of the moment during which the clock and data recovery circuit samples the incoming data. Typically the clock and data recovery circuit searches for the center of a bit period and samples the data at that location.

The center of the bit period is the optimum location for the measurement because the data is expected to have the least amount of voltage noise and timing jitter at that location. In fact, if the clock and data recovery circuit is unable to locate the middle of the bit period and is erroneously sampling near the edge of the bit period, then bit errors will occur.

A typical high speed communication system is capable of transferring data at a rate of two and one half Gigabits per second (2.5 Gb/s) and might require a bit error rate of $10^{-12}$. This means that the communication system has to transfer at least $10^{12}$ bits without any bit errors. To conduct a bit error test in which $10^{12}$ bits are passed would require approximately six (6) minutes and forty (40) seconds. This length of test time is unacceptable for modern integrated circuit chips because conducting such a lengthy test would significantly increase the cost of manufacture of each chip. Reducing the time required for the bit error test can realize significant savings in the manufacturing cost of each chip.

Therefore, there is a need in the art for a system and method for providing a clock and data recovery circuit that has a fast bit error rate self test capability. There is also a need in the art for a system and method for minimizing the test time for testing a bit error rate in a clock and data recovery circuit.

SUMMARY OF THE INVENTION

To address the above-discussed deficiencies of the prior art, it is a primary object of the present invention to provide a system and method for providing a clock and data recovery circuit that has a fast bit error rate self test capability.

In one advantageous embodiment of the present invention a clock and data recovery circuit comprises a bit error rate test control unit having a bit error rate self test capability. The bit error rate test control unit causes the clock and data recovery circuit to sample data adjacent to an edge of a bit period to create errors at a relatively high bit error rate. This is accomplished by intentionally introducing an interpolator offset in a phase position of a data clock signal.

The test control unit introduces a first value of interpolator offset to generate a first bit error rate. The test control unit then subsequently introduces a second value of interpolator offset to generate a second bit error rate. The test control unit then uses the values of the first and second bit error rates to extrapolate a value of bit error rate for the clock and data recovery circuit that corresponds to a zero value of interpolator offset. In this manner a fast determination may be made of the actual bit error rate of the clock and data recovery circuit.

It is an object of the present invention to provide a system and method for providing a clock and data recovery circuit that has a fast bit error rate self test capability.

It is also an object of the present invention to provide a system and method for that reduces the amount of time, expense, and test equipment that is required to perform bit error rate testing on a clock and data recovery circuit.

It is yet another object of the present invention to provide a system and method that increases the manufacturing profit margin for a clock and data recovery circuit.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 15 and the various embodiments used to describe the principles of the present invention in this patent document are by way of illustration only and should not be construed in any way to limit the scope of the invention. Those skilled in the art will understand that the principles of the present invention may be implemented in any type of suitably arranged clock and data recovery circuit.

To simplify the drawings the reference numerals from previous drawings will sometimes not be repeated for structures that have already been identified.

Figure 4:
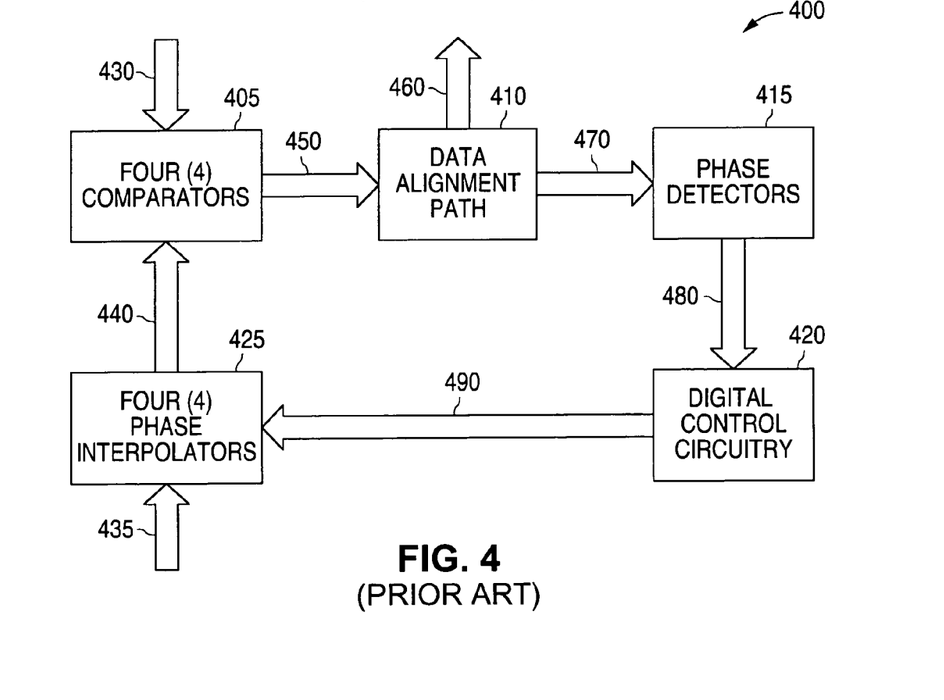
FIG. 4 illustrates a schematic diagram of a prior art clock and data recovery circuit.

In order to better understand the principles of the present invention a description of a prior art clock and data recovery system will first be given. FIG. 4 illustrates a schematic diagram of a prior art clock and data recovery circuit 400 that employs phase interpolator architecture. The clock and data recovery circuit 400 requires four (4) clock phases that are generated by a phase locked loop (PLL) (not shown in FIG. 4). The four clock phases are ninety degrees (90°) apart in phase and run at one half of the frequency of the incoming data stream. The four clock phases from the PLL are represented in FIG. 4 by arrow 435. The four clock phases are provided to a bank of four (4) phase interpolators 425 that are used to generate the recovered clock signal. The four interpolated clock phases from the four interpolators 425 (represented by arrow 440) are used to drive four input comparators 405 that sample the incoming data stream. The incoming data stream is represented in FIG. 4 by arrow 430.

The sampled data from the four input comparators 405 is provided to a data alignment path unit 410. The sampled data that is provided to the data alignment path unit 410 is represented in FIG. 4 by arrow 450. The data alignment path unit 410 provides an output signal that represents the clock and data output. The clock and data output from data alignment path unit 410 is represented in FIG. 4 by arrow 460.

The data alignment path unit 410 also provides an output signal to phase detectors 415. The output signal from data alignment path unit 410 to phase detectors 415 is represented in FIG. 4 by arrow 470. The phase detectors 415 determine whether the sampling moment is early or late for each bit. If the phase detectors 415 are not able to make a determination whether the sampling moment is early or late for each bit, they output a signal that represents a "no information" result. The phase detectors 415 provide an output that represents the "early/late/no info" information to digital control circuitry 420. The output that represents the "early/late/no info" information is represented in FIG. 4 by arrow 480.

The digital control circuitry 420 operates on the information from the phase detectors 415 to determine the appropriate clock phase to be used. The loop is completed when the digital control circuitry 420 sends interpolator control signals to the four phase interpolators 425. The interpolator control signals from digital control circuitry 420 are represented in FIG. 4 by arrow 490.

When the four input comparators 405 sample the incoming data stream 430 the four input comparators 405 translate portions of the incoming data stream 430 into a logic zero ("0") or a logic one ("1"). There are four (4) comparators in the input comparator block 405 that perform this function. These four comparators are driven by a variable phase clock signal (i.e., the recovered clock signal) to sample the signal in the middle of the data bit period.

As data is received, the bit stream is analyzed by the logic section of clock and data recovery circuit 400. The logic section comprises the data alignment path unit 410, the phase detectors 415, and the digital control circuitry 420. As previously mentioned, the phase detectors 415 determine whether the sampling moment is early or late (or no information is available) for each bit. The phase detectors 415 provide the "early/late/no info" decisions 480 to the digital control circuitry 420.

The digital control circuitry 420 accumulates the "early/late/no info" decisions and makes a determination whether the phase of the sampling clock should be advanced or retarded. The determination that is made with respect to advancing or retarding the sampling clock is translated into control signals 490 to be provided to the phase interpolators 425. The phase interpolators, in response, adjust the phase of the sampling clocks that feed into the four input comparators 405.

The clock and data recovery circuit 400 shown in FIG. 4 is capable of operating at frequencies that are lower than the frequency of the input data stream 430. In particular, the four input comparators 405 allow the clock and data recovery circuit 400 to sample the incoming data stream 430 at one half of the data rate of the incoming data stream 430. Further parallelization in the data path in the logic section of the clock and data recovery circuit 400 enables the frequency of the logic section to be decreased by an additional factor of two or more.

Figure 5:
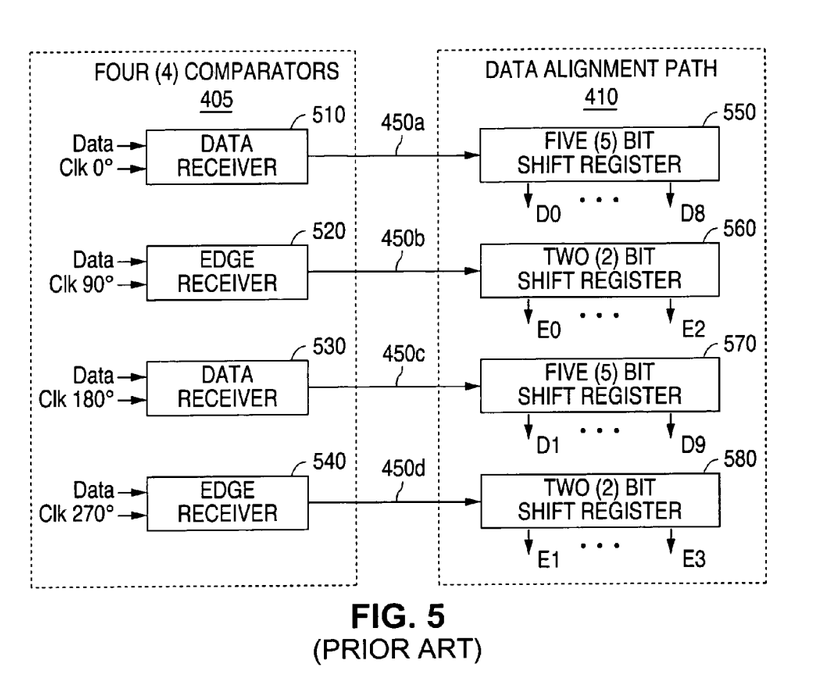
FIG. 5 illustrates a schematic diagram showing a more detailed view of the four comparators and data alignment path shown in FIG. 4.

The clock and data recovery circuit 400 shown in FIG. 4 comprises a mixture of analog blocks and digital blocks that are connected in a loop that controls the clock and data recovery function. The clock and data recovery circuit 400 works by taking two samples for every incoming bit. The first sample is a data sample in the middle of the bit period and the second sample is an edge sample in the bit transition region. The clock and data recovery circuit 400 samples two bits at a time by employing four input comparators 405 that are sampling with a phase shift of ninety degrees (90°) between each of the four input comparators 405. A more detailed view of the four input comparators 405 is shown in FIG. 5.

The first comparator is a data receiver 510 that receives as input the data and a clock signal at a phase of zero degrees (0°). The second comparator is an edge receiver 520 that receives as input the data and a clock signal at a phase of ninety degrees (90°). The third comparator is a data receiver 530 that receives as input the data and a clock signal at a phase of one hundred eighty degrees (180°). The fourth comparator is an edge receiver 540 that receives as input the data and a clock signal at a phase of two hundred seventy degrees (270°).

The output of the four comparators (510, 520, 530, 540) generates four streams of sampled information that is fed to four parallel shift registers in the data alignment path unit 410. A more detailed view of the data alignment path unit 410 is also shown in FIG. 5.

The output 450*a* from data receiver 510 is provided to five (5) bit shift register 550. The output 450*b* from edge receiver 520 is provided to two (2) shift register 560. The output 450*c* from data receiver 530 is provided to five (5) bit shift register 570. the output 450*d* from edge receiver 540 is provided to two (2) bit shift register 580.

The shift registers (550, 560, 570, 580) hold the sampled data for five (5) clock cycles. The data that is held in the shift registers of data alignment path unit 410 is passed out of the clock and data recovery circuit 400 in a ten (10) bit parallel bus (not shown) that operates at one tenth (1/10) of the data rate of the incoming data stream 430. The clock and data recovery circuit 400 also generates a divide-by-ten (10) version of the recovered clock signal that accompanies the parallel data. This divide-by-ten (10) clock signal is derived from one of the interpolated phases of the clock and data recovery circuit 400.

Figure 6:
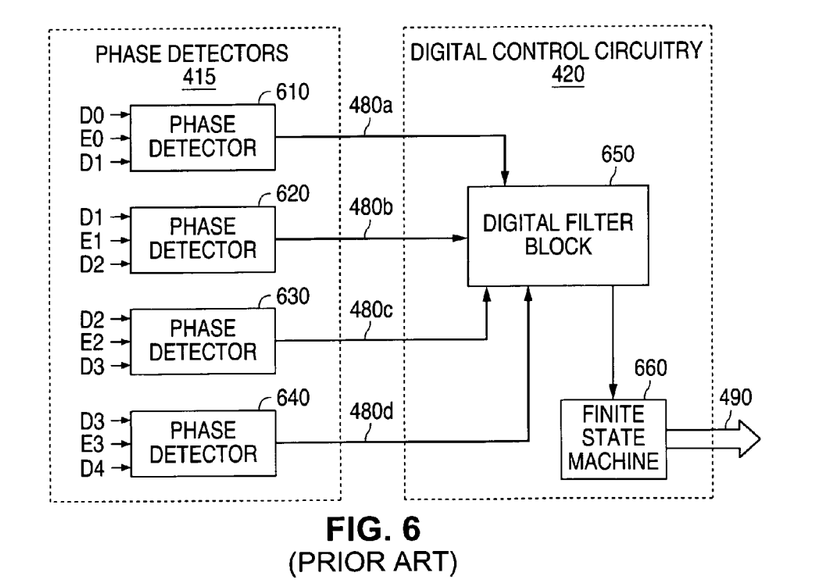
FIG. 6 illustrates a schematic diagram showing a more detailed view of the phase detectors and the digital control circuitry shown in FIG. 4.

The data alignment path unit 410 also provides the sampled data to the phase detectors 415. A more detailed view of the phase detectors 415 and the digital control circuitry 420 is shown in FIG. 6. Digital control circuitry 420 comprises digital filter block 650 and finite state machine 660.

Phase detector 610 receives data signals D0, E0, and D1 from data alignment path unit 410. Phase detector 620 receives data signals D1, E1, and D2 from data alignment path unit 410. Phase detector 630 receives data signals D2, E2, and D3 from data alignment path unit 410. Phase detector 640 receives data signals D3, E3, and D4 from data alignment path unit 410.

Phase detector 610 provides an "early/late/no info" data signal 480*a* to digital filter block 650 of digital control circuitry 420. Phase detector 620 provides an "early/late/no info" data signal 480*b* to digital filter block 650 of digital control circuitry 420. Phase detector 630 provides an "early/late/no info" data signal 480*c* to digital filter block 650 of digital control circuitry 420. Phase detector 640 provides an "early/late/no info" data signal 480*d* to digital filter block 650 of digital control circuitry 420.

The digital control circuitry 420 processes the sampled data to determine whether the clock and data recovery circuit 400 is sampling too early, or sampling too late, or sampling in the center. This data processing function is performed by the digital filter block 650 and the finite state machine 660. The digital filter block 650 is an accumulator and zero-crossing detector that analyzes the bit transition information in the data stream to decide whether the clock and data recovery circuit 400 is early or late. The digital filter block 650 then accumulates these early/late decisions into a variable bit-depth accumulator that acts as a digital loop filter. The accumulator can be designed to have any value of bit depth suitable to the system.

If the digital filter block 650 completes a full revolution in the clockwise direction then the digital filter block 650 sends an "up" signal to the finite state machine 660. If the digital filter block 650 completes a full revolution in the counter clockwise direction then the digital filter block 650 sends a "down" signal to the finite state machine 660. The "up" and "down" signals are fed into the finite state machine 660 and the finite state machine 660 translates the "up" and "down" signals into position information in phase space for the phase interpolators 425. The signals from the finite state machine 660 to the phase interpolators 425 are represented in FIG. 6 (and in FIG. 4) by arrow 490.

The finite state machine 660 keeps track of the phase interpolator position by processing the "up" and "down" signals from the digital filter block 650 and producing quadrant and phase position information. The quadrant signal is transmitted on a two bit bus (not shown) that is gray coded to ensure a maximum of one bit transition at a time. The phase position signal is transmitted on a fifteen bit bus (not shown) that is thermometer encoded. This arrangement also ensures a maximum of one bit transition at a time. In addition, the finite state machine 660 is designed not to have a quadrant transition and a phase transistor transition occur at the same time. This feature minimizes the amount of internal jitter generated by the system.

Figure 7:
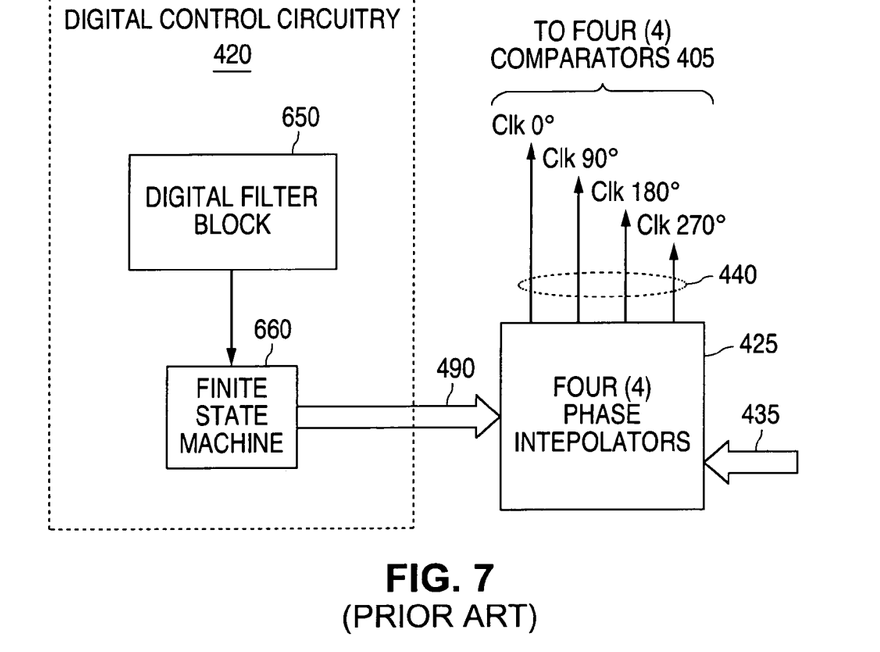
FIG. 7 illustrates a schematic diagram showing a more detailed view of the connection of the digital control circuitry to the four phase interpolators shown in FIG. 4.

As shown in FIG. 7, the output (represented by the arrow 490) of finite state machine 660 is provided to the four phase interpolators 425. As previously described, the four phase interpolators 425 also receive four clock phases (represented by the arrow 435) from the PLL (not shown) that are ninety degrees (90°) apart in phase and that run at one half of the frequency of the incoming data stream 430. The four phase interpolators 425 generate four interpolated clock phases 440 and output them to the four input comparators 405. As shown in FIG. 7, the four interpolated clock phases 440 are ninety degrees (90°) apart in phase.

One of the important features of clock and data recovery circuit 400 is its ability to recover signals that run at a higher rate than the sampling clock of the clock and data recovery circuit 400. This is accomplished by deploying a number of parallel paths to recover and process the data. The processing frequency of the four input comparators 405 is dropped by a factor of two from the data rate of the incoming data stream 430 by using four comparators instead of two comparators.

Later, the data is loaded into the shift registers (550, 560, 570, 580) of the data alignment path unit 410 where the incoming data bits are stored for five clock cycles. The bit information is processed four bits at a time in parallel with the digital filter block 650. This means that the clock frequency of the digital filter block 650 may be dropped by another factor of two. This down-stepping of operating frequency enables such a design to process data that is running at a higher bandwidth than the process technology can normally handle. The clock signal (not shown) that drives the digital filter block 650 and the finite state machine 660 is derived from one of the interpolated clock phases of the clock and data recovery circuit 400.

Figure 8:
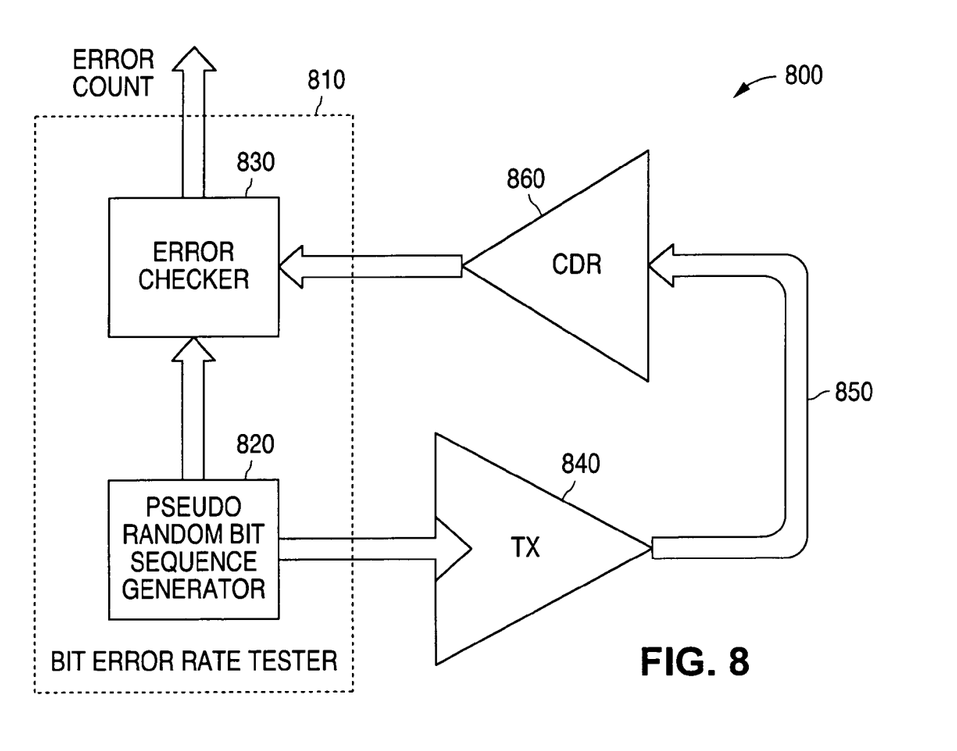
FIG. 8 illustrates a schematic diagram showing a configuration of a bit error rate tester in a clock and data recovery circuit.

A clock and data recovery circuit may utilize an internal bit error rate tester (BERT). FIG. 8 illustrates a schematic diagram 800 showing a configuration of a bit error rate tester 810. Bit error rate tester 810 comprises a pseudo random bit sequence (PRBS) generator 820 and an error checker 830. The pseudo random bit sequence generator 820 generates random data bits that are passed to the transmitter 840 and the looped back internally through an internal loopback 850 to the input of the clock and data recovery circuit 860. The clock and data recovery circuit 860 recovers the clock and data information from the input stream and passes it back the error checker 830 in the bit error rate tester 810. The error checker 830 computes the number of bit errors that may have occurred during the process. In general, the bit error rate tester 810 can be used to check different parameters of the clock and data recovery circuit 860 such as input sensitivity and noise tolerance.

Figure 9:
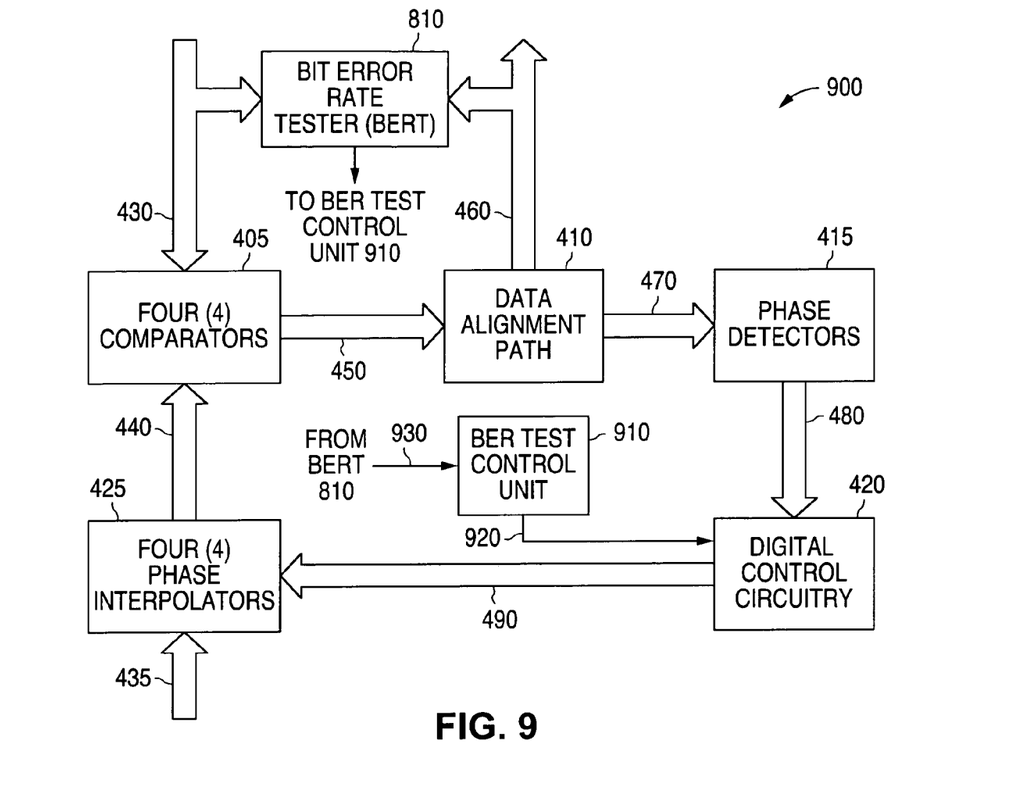
FIG. 9 illustrates a schematic diagram showing a test control unit of the present invention coupled to a clock and data recovery circuit that comprises a bit error rate tester.

FIG. 9 illustrates a schematic diagram showing a bit error rate (BER) test control unit 910 of the present invention coupled to a clock and data recovery circuit of the type shown in FIG. 4. The clock and data recovery circuit also comprises a bit error rate tester (BERT) 810. The clock and data recovery unit that comprises bit error rate tester (BERT) 810 and bit error rate (BER) test control unit 910 will be referred to with reference numeral 900.

As shown in FIG. 9, BER test control unit 910 provides control signals to digital control circuitry 420 through control line 920. BER test control unit 910 also receives signals from bit error rate tester (BERT) 810 through control line 930.

The BER test control unit 910 provides bit error rate self test capability to the clock and data recovery circuit 900. The BER test control unit 910 of the clock and data recovery circuit 900 reduces the test time required for testing the bit error rate by intentionally introducing bit errors into the system. The bit errors are introduced by forcing the clock and data recovery circuit 900 to sample the data away from the center of the bit period and closer to the edge of the bit period. This change of location for sampling the data significantly increases the bit error rate.

The erroneous sampling moment is produced by introducing an intentional interpolator offset in the phase position of the two data clocks. The interpolator offset can be set to a number of different values. A first bit error rate can be measured for a first given interpolator offset value. Then a second bit error rate can be measured for a second given interpolator offset value. The bit error rates of the two data points may then be plotted on a graph as a function of interpolator offset. The bit error rate (BER) under normal operation (when the value of the interpolator offset is zero) may be found by extrapolation.

Figure 10:
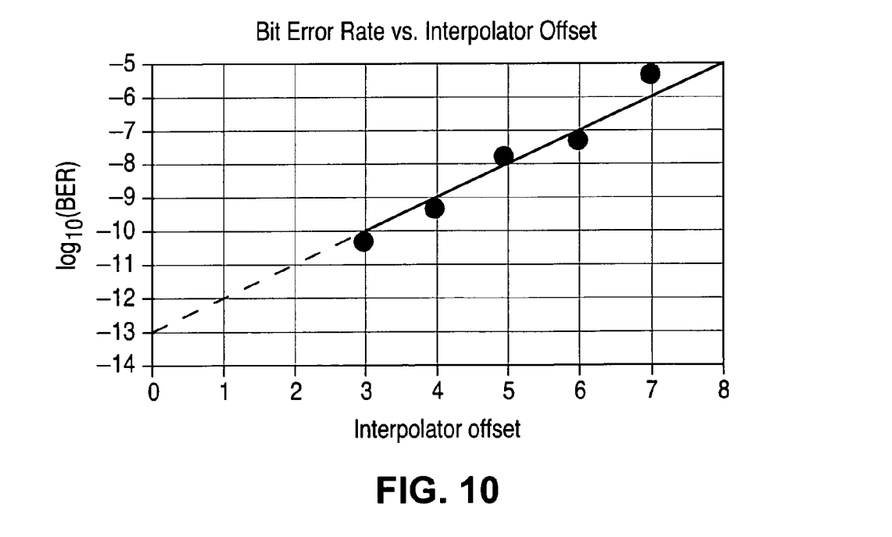
FIG. 10 illustrates a graph showing measured values of bit error rate as a function of interpolator offset.

The graph and the extrapolation procedure are illustrated in FIG. 10. The graph in FIG. 10 shows an example of several bit error rate measurements (on the vertical axis) that would be taken at different values of interpolator offset (on the horizontal axis). The higher valued bit error rates are represented by the solid dots on the graph. The solid line is the best fit linear regression line for these data points. The line can be extended (as shown in the dashed portion of the line) to deduce the value of the bit error rate when the interpolator offset has a value of zero. In the example shown in the graph of FIG. 10, the value of the bit error rate for a zero interpolator offset is $10^{-13}$.

In general, two measurement points are sufficient to extrapolate the bit error rate (BER) of the clock and data recovery circuit 900. For example, if one measures the bit error rates of $10^{-6}$ and $10^{-7}$, the measurement would take approximately four and four tenths milliseconds (4.4 ms) instead of the nearly seven (7) minutes that are required to measure the $10^{-12}$ bit error rate. This is a very important time difference because the costs associated with testing have become a significant fraction of the overall costs of manufacturing clock and data recovery circuits. The fast bit error rate test capability of the test control unit 910 of the present invention reduces the amount of time and test equipment that is required to measure a bit error rate for the clock and data recovery circuit 900. This reduction in the amount of time and test equipment increases the manufacturing profit margin for the clock and data recovery circuit 900.

The operation of the test control unit 910 will now be considered in more detail. As previously mentioned, the test control unit 910 performs a fast bit error rate measurement by sampling the data away from the center of the bit period. This operation is accomplished by manipulating the interpolators that generated the data clock signals.

Figure 11:
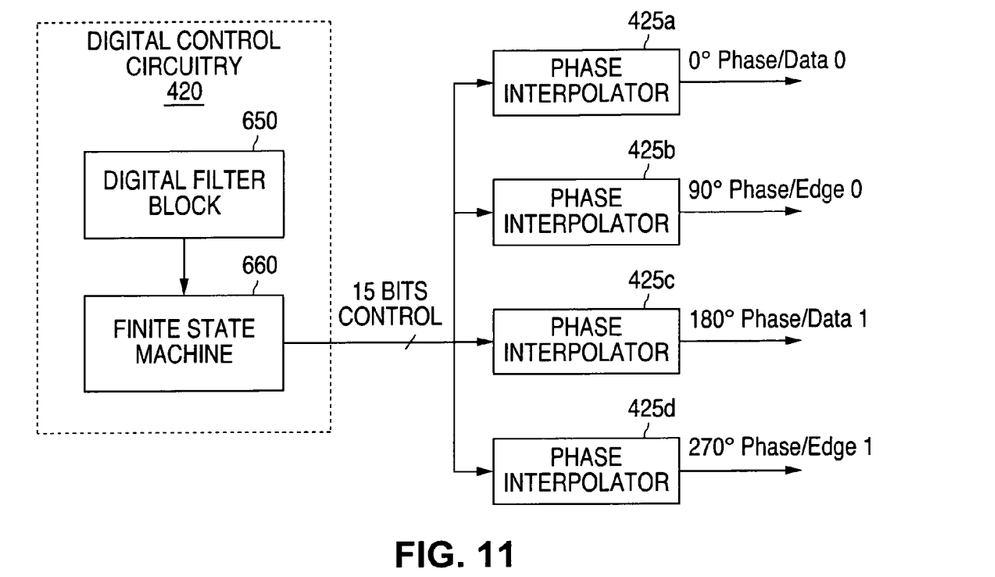
FIG. 11 illustrates a schematic diagram showing the digital control circuitry and the phase interpolators during a normal mode of operation of the invention.

FIG. 11 illustrates a schematic diagram of the digital control circuitry 420 and the phase interpolators 425 during a normal (i.e., non-test) mode of operation of the invention. The phase interpolators (425a, 425b, 425c, 425d) are wired so that they produce four quadrature phases of the recovered clock signal. The finite state machine 660 generates a fifteen (15) bit control word that sets the phase location for all four of the phase interpolators. The phase interpolators adjust the recovered clock phase in response to control signals from the finite state machine 660. In fact, the four interpolators generate four phases of the recovered clock signal that are ninety degrees (90°) apart. This phase relationship is strictly maintained during the normal operation (i.e., the non-test mode of operation) of clock and data recovery circuit 900.

Figure 12:
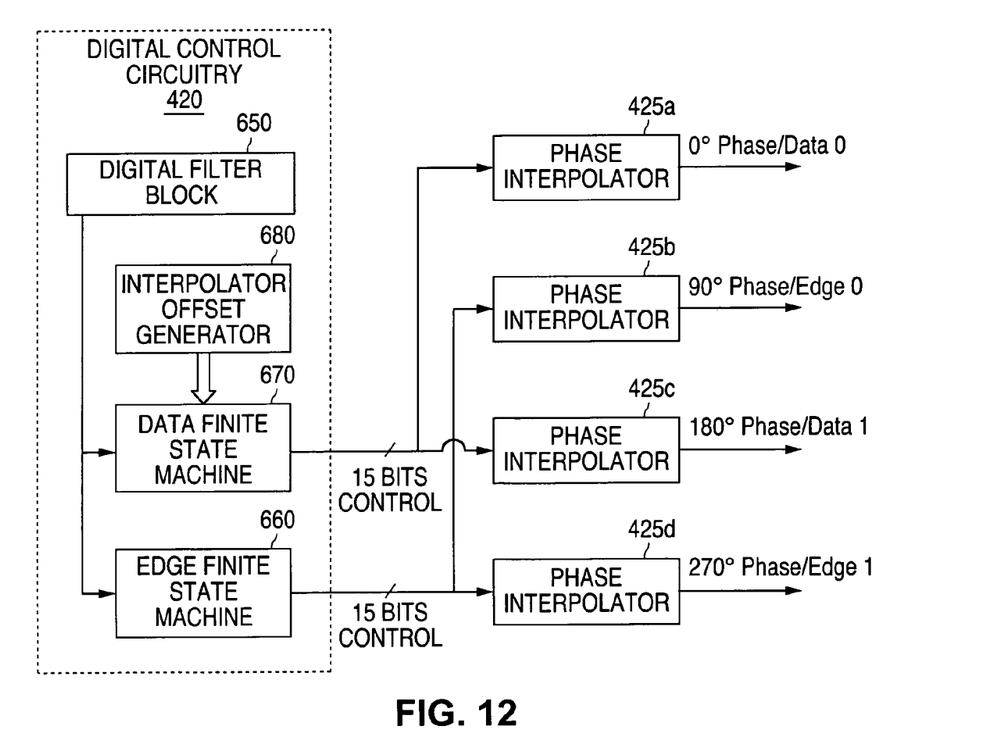
FIG. 12 illustrates a schematic diagram showing the digital control circuitry and the phase interpolators during a test mode of operation of the invention.

FIG. 12 illustrates a schematic diagram of the digital control circuitry 420 and the phase interpolators 425 during a test mode of operation of the invention. As previously mentioned, the test control unit 910 performs the fast bit error rate measurement through non-optimal sampling of the data. The non-optimal sampling moment is generated by corrupting the ninety degree (90°) phase relationship between the four recovered clock phases. This is done by introducing a second finite state machine into the signal path as shown in FIG. 12. The second finite state machine is designated as the data finite state machine 670. The original finite state machine 660 is designated as the edge finite state machine 660.

The first finite state machine 660 (i.e., the edge finite state machine 660) will continue to control phase interpolator 425b and phase interpolator 425d and handle the edge information. That is, first finite state machine 660 generates a fifteen (15) bit control word that sets the phase location for the two phase interpolators (425b and 425d) that handle the edge information.

The second finite state machine 670 (i.e., the data finite state machine 670) will control phase interpolator 425a and phase interpolator 425c and handle the data information. That is, second finite state machine 670 generates a fifteen (15) bit control word that sets the phase location for the two phase interpolators (425a and 425c) that handle the data information.

When test control unit 910 begins a bit error rate measurement, test control unit 910 suspends normal operation and then sends control signals to the digital control circuitry 420 to activate the concurrent operation of the first finite state machine 660 (to handle the edge information) and the second finite state machine 670 (to handle the data information). In this manner the control of the phase interpolators 425 is divided between the two finite state machines, 660 and 670.

The second finite state machine 670 (i.e., the data finite state machine 670) receives signals from an interpolator offset generator 680. The interpolator offset generator 680 receives signals from test control unit 910 through control line 920 (not shown in FIG. 12). The interpolator offset generator 680 is capable of adding or subtracting an amount of interpolator offset (that is specified by the user) to the phase location of the data interpolator.

This operation can be performed in a digital fashion by performing an addition or subtraction operation on the fifteen (15) bit control word that is the output of the second finite state machine 670. The same operation can also be performed in an analog fashion if the interpolator offset generator 680 provides additional "up" or "down" pulses to the second (data) finite state machine 670.

The effect of the interpolator offset addition is to corrupt the phase relationship between the four phases of the recovered clock signal. The clock and data recovery control loop will continue to place the edge clock phases at the edge of the bit period. However, the clock and data recovery control loop will now skew the data phases closer to one edge or another of the bit period depending upon the sign of the interpolator offset.

Figure 13:
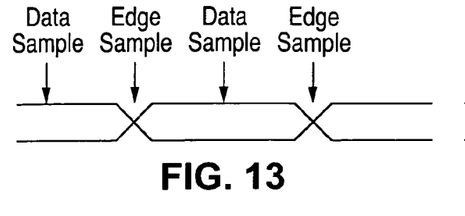
FIG. 13 illustrates an input data signal showing the location of data and edge samples for ideal double sampling.
Figure 14:
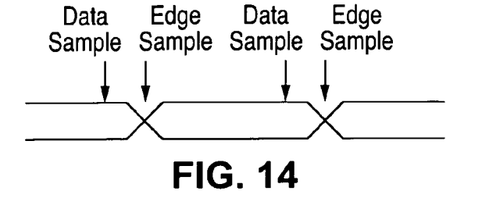
FIG. 14 illustrates an input data signal showing the location of data and edge samples for offset double sampling.

This is illustrated in FIG. 13 and in FIG. 14. FIG. 13 illustrates an input data signal showing the location of data and edge samples for ideal double sampling. The data samples are taken in the middle of the bit period. The edge samples are taken at the bit crossover point.

FIG. 14 shows the data sampling moment offset in order to sample the data bits later than would be the case in the ideal double sampling. The closer that the data phase is to the edge of the bit period the more likely a bit error will occur due to jitter and timing variation near the bit crossover region. This causes the internal bit error rate tester (BERT) 810 to measure a high bit error rate if the interpolator offset is set to a high value.

As previously mentioned, two bit error rate (BER) measurements at two different values of interpolator offset are sufficient to extrapolate the actual bit error rate during normal operation when the interpolator offset is zero.

The test control unit 910 makes the two different bit error rate measurements, and then mathematically performs the extrapolation process to obtain the actual bit error rate. After the test has been completed the test control unit 910 sends control signals to the phase detectors 415 and to the digital control circuitry 420 to return the operation of clock and data recovery circuit 900 to its normal mode of operation.

Figure 15:
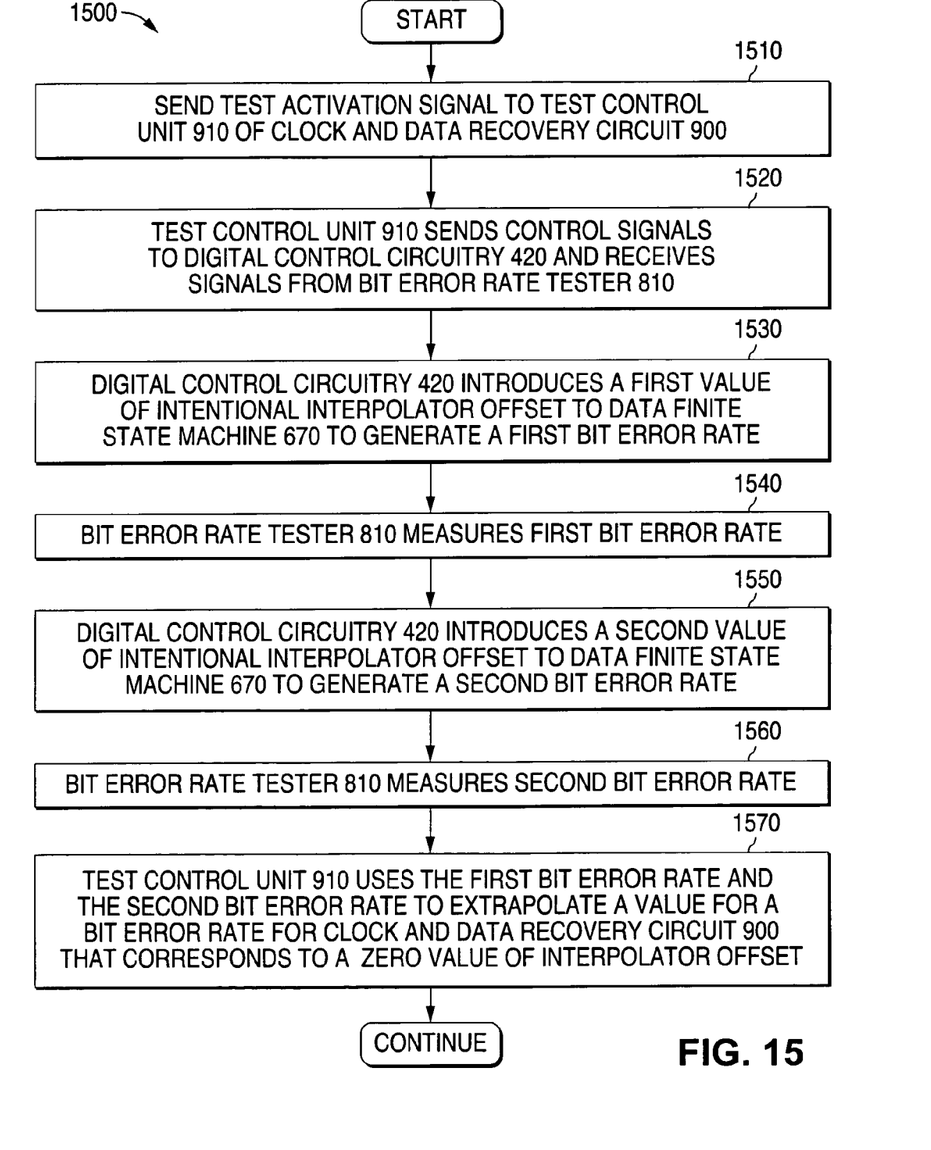
FIG. 15 illustrates a flow chart showing the steps of an advantageous embodiment of the method of the present invention.

FIG. 15 illustrates a flow chart 1500 showing the steps of an advantageous embodiment of the method of the present invention. The method begins when a user sends a test activation signal to the test control unit 910 of the clock and data recovery circuit 900 (step 1510). Then test control unit 910 sends control signals to the digital control circuitry 420 and receives signals from the bit error rate tester 810 (step 1520).

Then the digital control circuitry 420 introduces a first value of intentional interpolator offset to data finite state machine 670 to generate a first bit error rate (step 1530). Then bit error rate tester 810 measures the first bit error rate (step 1540). Then the digital control circuitry 420 introduces a second value of intentional interpolator offset to data finite state machine 670 to generate a second bit error rate (step 1550). Then bit error rate tester 810 measures the second bit error rate (step 1560).

Then test control unit 910 uses the first bit error rate and the second bit error rate to extrapolate a value for a bit error rate for clock and data recovery circuit 900 that corresponds to a zero value of interpolator offset (step 1570).

Although the present invention has been described with an exemplary embodiment, various changes and modifications may be suggested to one skilled in the art. It is intended that the present invention encompass such changes and modifications as fall within the scope of the appended claims.

What is claimed is:

1. A clock and data recovery circuit that comprises:
    a plurality of comparators, a data alignment path unit, a plurality of phase detectors, digital control circuitry, and a plurality of phase interpolators, connected in a loop configuration;
    a bit error rate tester;
    a bit error rate test control unit that introduces bit errors into data within said clock and data recovery circuit to create a bit error rate within said clock and data recovery circuit;
    wherein the digital control circuitry comprises:
        at least one edge finite state machine that controls at least one of the phase interpolators that handles edge information; and
        at least one data finite state machine that controls at least one of the phase interpolators that handles data information.

2. The clock and data recovery circuit as set forth in claim 1 wherein said bit error rate test control unit that introduces bit errors into data within said clock and data recovery circuit causes said clock and data recovery circuit to sample data adjacent to an edge of a bit period.

3. The clock and data recovery circuit as set forth in claim 2 wherein said bit error rate test control unit that causes said clock and data recovery circuit to sample data adjacent to an edge of a bit period introduces an interpolator offset in a phase position of at least one data clock signal.

4. The clock and data recovery circuit as set forth in claim 3 wherein said bit error rate test control unit introduces a first value of interpolator offset in a phase position of at least one data clock signal to generate a first value of bit error rate; and wherein said bit error rate test control unit subsequently introduces a second value of interpolator offset in a phase position of at least one data clock signal to generate a second value of bit error rate.

5. The clock and data recovery circuit as set forth in claim 4 wherein said bit error rate test control unit calculates from said first value of bit error rate and from said second value of bit error rate an extrapolated value of bit error rate that corresponds to a zero value of interpolator offset.

6. The clock and data recovery circuit as set forth in claim 1 wherein said digital control circuitry further comprises:
an interpolator offset generator coupled to said at least one data finite state machine, wherein said interpolator offset generator adds an amount of interpolator offset to a phase location of said at least one phase interpolator controlled by said at least one data finite state machine.

7. The clock and data recovery circuit as set forth in claim 6 wherein said interpolator offset generator subtracts an amount of interpolator offset from a phase location of said at least one phase interpolator controlled by said at least one data finite state machine.

8. The clock and data recovery circuit as set forth in claim 1, wherein the bit error rate test control unit provides control signals to the digital control circuitry through a first control line, and the bit error rate test control unit receives signals from the bit error rate tester through a second control line.

9. A method for measuring a bit error rate in a clock and data recovery circuit that comprises a plurality of comparators, a data alignment path unit, a plurality of phase detectors, digital control circuitry, and a plurality of phase interpolators, connected in a loop configuration, and a bit error rate tester, said method comprising the steps of:
introducing bit errors into data within said clock and data recovery circuit to create a bit error rate within said clock and data recovery circuit using a bit error rate test control unit coupled to said clock and data recovery circuit;
controlling at least one of the phase interpolators that handles edge information with at least one edge finite state machine in the digital control circuitry of the clock and data recovery circuit; and
controlling at least one of the phase interpolators that handles data information with at least one data finite state machine in the digital control circuitry of the clock and data recovery circuit.

10. The method as set forth in claim 9 wherein said step of introducing bit errors into data within said clock and data recovery circuit comprises the step of:
causing said clock and data recovery circuit to sample data adjacent to an edge of a bit period.

11. The method as set forth in claim 10 wherein said step of causing said clock and data recovery circuit to sample data adjacent to an edge of a bit period comprises the step of:
introducing an interpolator offset in a phase position of at least one data clock signal.

12. The method as set forth in claim 11 further comprising the steps of:
introducing a first value of interpolator offset from said bit error rate test control unit to a phase position of at least one data clock signal to generate a first value of bit error rate in said clock and data recovery circuit; and
subsequently introducing a second value of interpolator offset from said bit error rate test control unit to a phase position of at least one data clock signal to generate a second value of bit error rate in said clock and data recovery circuit.

13. The method as set forth in claim 12 further comprising the steps of:
calculating in said bit error rate test control unit from said first value of bit error rate and from said second value of bit error rate an extrapolated value of bit error rate that corresponds to a zero value of interpolator offset.

14. The method as set forth in claim 11 wherein the step of introducing an interpolator offset in a phase position of at least one data clock signal comprises one of: (1) introducing an interpolator offset with a positive value, and (2) introducing an interpolator offset with a negative value.

15. The method as set forth in claim 9 further comprising the step of:
adding an amount of interpolator offset to a phase location of said at least one phase interpolator controlled by said at least one data finite state machine.

16. The method as set forth in claim 15 further comprising the step of:
subtracting an amount of interpolator offset from a phase location of said at least one phase interpolator controlled by said at least one data finite state machine.

17. The method as set forth in claim 9, further comprising the steps of:
providing control signals from the bit error rate test control unit to the digital control circuitry through a first control line; and
providing signals from the bit error rate tester to the bit error rate test control unit through a second control line.

18. An apparatus comprising:
a clock and data recovery circuit that comprises a plurality of comparators, a data alignment path unit, a plurality of phase detectors, digital control circuitry, and a plurality of phase interpolators, connected in a loop configuration;
a bit error rate tester; and
a bit error rate test control unit coupled to said clock and data recovery circuit that introduces bit errors into data within said clock and data control circuit to create a bit error rate within said clock and data control circuit;
wherein the digital control circuit comprises:
at least one edge finite state machine that controls at least one of the phase interpolators that handles edge information; and
at least one data finite state machine that controls at least one of the phase interpolators that handles data information.

19. The bit error rate test control unit as set forth in claim 18 wherein said bit error rate test control unit causes said clock and data recovery circuit to sample data adjacent to an edge of a bit period.

20. The bit error rate test control unit as set forth in claim 19 wherein said bit error rate test control unit introduces an interpolator offset in a phase position of at least one data clock signal.

* * * * *

UNITED STATES PATENT AND TRADEMARK OFFICE
CERTIFICATE OF CORRECTION

PATENT NO. : 7,571,360 B1
APPLICATION NO. : 10/973843
DATED : August 4, 2009
INVENTOR(S) : Laurence D. Lewicki, Amjad T. Obeidat and Nicolas Nodenot It is certified that error appears in the above-identified patent and that said Letters Patent is hereby corrected as shown below:

Column 9, line 6, delete "transistor".

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,571,360 B1  Page 1 of 1
APPLICATION NO. : 10/973843
DATED : August 4, 2009
INVENTOR(S) : Lewicki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this

Seventh Day of September, 2010

David J. Kappos
*Director of the United States Patent and Trademark Office*